United States Patent
Yang et al.

(10) Patent No.: US 10,225,853 B2
(45) Date of Patent: Mar. 5, 2019

(54) METHOD AND APPARATUS FOR SCHEDULING STATIONS

(71) Applicant: Huawei Technologies Co., Ltd., Shenzhen (CN)

(72) Inventors: Xun Yang, Shenzhen (CN); Yunbo Li, Shenzhen (CN); Yi Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 526 days.

(21) Appl. No.: 14/921,797

(22) Filed: Oct. 23, 2015

(65) Prior Publication Data

US 2016/0044703 A1 Feb. 11, 2016

Related U.S. Application Data

(63) Continuation of application No. PCT/CN2013/088722, filed on Dec. 6, 2013.

(30) Foreign Application Priority Data

Apr. 24, 2013 (CN) .......................... 2013 1 0145023

(51) Int. Cl.
*H04W 72/12* (2009.01)
*H04W 88/02* (2009.01)

(52) U.S. Cl.
CPC ....... *H04W 72/1257* (2013.01); *H04W 72/12* (2013.01); *H04W 88/02* (2013.01)

(58) Field of Classification Search
None
See application file for complete search history.

(56) References Cited

U.S. PATENT DOCUMENTS

| 7,184,407 B1* | 2/2007 | Myles | H04W 16/14 370/242 |
| 2003/0179756 A1* | 9/2003 | Cain | H04B 7/0491 370/395.42 |

(Continued)

FOREIGN PATENT DOCUMENTS

| CN | 101282256 A | 10/2008 |
| CN | 101540709 A | 9/2009 |

(Continued)

*Primary Examiner* — Hassan A Phillips
*Assistant Examiner* — Gautam Sharma
(74) *Attorney, Agent, or Firm* — Leydig, Voit & Mayer, Ltd.

(57) ABSTRACT

A method for scheduled stations is provided. The method includes: receiving identification information of a neighbor station of a target station reported by the target station; treating, based on pre-acquired information of a basic service set to which the target station belongs and the identification information, each station except the neighbor station among the stations included in the basic service set as a latent hidden station of the target station; and scheduling, based on a transmission strategy currently used by the target station, a scheduled station corresponding to the transmission strategy to perform data transmission with the target station in a target mode, wherein the scheduled station corresponding to the transmission strategy is the station corresponding to the transmission strategy in a pre-acquired mapping relation between the transmission strategy and the station.

14 Claims, 7 Drawing Sheets

(56) References Cited

U.S. PATENT DOCUMENTS

| | | | |
|---|---|---|---|
| 2004/0023678 A1* | 2/2004 | Fredriksson | G06F 1/14 |
| | | | 455/502 |
| 2007/0041334 A1 | 2/2007 | Song et al. | |
| 2007/0155431 A1* | 7/2007 | Munzner | H04W 72/0406 |
| | | | 455/560 |
| 2007/0249386 A1* | 10/2007 | Bennett | H04N 21/4126 |
| | | | 455/550.1 |
| 2008/0123682 A1* | 5/2008 | Yackoski | H04L 45/34 |
| | | | 370/443 |
| 2008/0247407 A1* | 10/2008 | Westphal | H04W 72/1257 |
| | | | 370/406 |
| 2009/0034489 A1* | 2/2009 | Adams | H04W 72/082 |
| | | | 370/337 |
| 2009/0196174 A1 | 8/2009 | Ji | |
| 2010/0130223 A1* | 5/2010 | Liao | H04B 7/0617 |
| | | | 455/453 |
| 2010/0177665 A1 | 7/2010 | Ayyagari et al. | |
| 2010/0220643 A1* | 9/2010 | Qi | H04W 72/005 |
| | | | 370/312 |
| 2011/0069670 A1 | 3/2011 | Lee et al. | |
| 2013/0176954 A1 | 7/2013 | Lv et al. | |
| 2015/0124800 A1 | 5/2015 | Sakoda | |
| 2016/0365963 A1 | 12/2016 | Yang et al. | |

FOREIGN PATENT DOCUMENTS

| | | |
|---|---|---|
| CN | 102045745 A | 5/2011 |
| CN | 102448125 A | 5/2012 |
| CN | 102821420 A | 12/2012 |
| CN | 103002591 A | 3/2013 |
| EP | 1755279 A2 | 2/2007 |
| JP | 2006197483 A | 7/2006 |
| JP | 4588465 B2 | 12/2010 |
| KR | 20070021729 A | 2/2007 |
| KR | 20110031135 A | 3/2011 |
| WO | WO 2007078073 A1 | 7/2007 |

* cited by examiner

METHOD AND APPARATUS FOR SCHEDULING STATIONS

CROSS-REFERENCE TO RELATED APPLICATIONS

This application is a continuation of International Patent Application No. PCT/CN2013/088722, filed on Dec. 6, 2013, which claims priority to Chinese Patent Application No. 201310145023.7 filed on Apr. 24, 2013, both of which are hereby incorporated by reference in their entireties.

FIELD OF THE TECHNOLOGY

The present application relates to the field of wireless communication technology, particularly to a method and an apparatus for scheduling stations.

BACKGROUND

Latent hidden stations are stations sensing differently from each other, and are common in wireless networks with carrier sense access and relatively large coverage area. In practical application, in some transfer strategies, conflicts arise when stations latent hidden to each other initiate data transmission simultaneously, leading to a case that after respective stations finish data transmission, there is no expected response, and the respective stations back-off for a random period and once again compete for data transmission; while in some other transfer strategies, no conflicts arise when stations latent hidden to each other initiate data transmission simultaneously, and utilization of the network resource may be improved, for example, Multiuser Multiple-Input Multiple-Out-Put (MU MIMO) transmission strategy is suitable for the case that stations latent hidden to each other initiate data transmission simultaneously.

Currently, the issue of latent hidden stations is solved through the following way:

the station sends a short frame to an access point (AP) before sending data, to sound out whether the channel is idle, and at the same time sets a network allocation vector (NAV) for other stations on the largest scale through the short frame;

the station receives from the AP a frame in response to the short frame, and determines that at this moment the channel is idle and channel reservation succeeds; and during this period stations latent hidden to the station can not send data to the AP; and the station sends data to the AP.

In the above technical solution, advantages of the AP in the process of data transmission are not effectively used, and it is required to send the short frame every time before sending data, thus additional overhead is caused.

SUMMARY

A method and device for scheduling stations are provided according to the embodiments of the disclosure, whit which advantage of the AP in the process of data transmission is effectively used, and additional overhead is reduced.

In a first aspect, a method for scheduling stations according to the embodiments of the disclosure includes:

receiving identification information of a neighbor station of a target station reported by the target station;

treating, based on pre-acquired information of a basic service set to which the target station belongs and the identification information, each station except the neighbor station among the stations included in the basic service set as a latent hidden station of the target station; and scheduling, based on a transmission strategy currently used by the target station, a scheduled station corresponding to the transmission strategy to perform data transmission with the target station in a target mode, wherein the scheduled station corresponding to the transmission strategy is the station corresponding to the transmission strategy in a pre-acquired mapping relation between the transmission strategy and the station, which comprises the neighbor station or the latent hidden station, and the target mode is a data transmission mode corresponding to the transmission strategy.

In a first available implementation of the first aspect, before treating each station except the neighbor station among the stations included in the basic service set as the latent hidden station of the target station based on pre-acquired information of the basic service set to which the target station belongs, the method further includes:

establishing a correspondence relation between the target station and the neighbor station, and storing the correspondence relation, to subsequently calculate the latent hidden station.

In conjunction with the first aspect or the first available implementation of the first aspect, in a second available implementation of the first aspect, after treating each station except the neighbor station among the stations included in the basic service set as the latent hidden station of the target station, and before scheduling the scheduled station corresponding to the transmission strategy to perform data transmission with the target station in the target mode based on a transmission strategy currently used by the target station, the method further includes:

establishing a correspondence relation between the target station and the latent hidden station, and storing the correspondence relation, to schedule the target station to perform data transmission with the latent hidden station in the target mode.

In conjunction with any one of the above implementation of the first aspect, in a third available implementation of the first aspect, the identification information further includes information of the basic service set to which the neighbor station belongs; and the neighbor station includes a first neighbor station and a second neighbor station, where the first neighbor station is the neighbor station included in the basic service set to which the target station belongs, and the second neighbor station is the neighbor station not included in the basic service set to which the target station belongs.

In conjunction with the third available implementation of the first aspect, in a fourth available implementation, in a case that the scheduled station comprises the second neighbor station, scheduling the scheduled station corresponding to the transmission strategy to perform data transmission with the target station in the target mode based on the transmission strategy currently used by the target station, includes:

sending, based on the transmission strategy currently used by the target station, a request message to a target access point requesting to schedule the second neighbor station corresponding to the transmission strategy to perform data transmission with the target station in the target mode, in order to allow the target access point to schedule the second neighbor station to perform data transmission with the target station in the target mode, wherein the target access point is the access point in the basic service set to which the second neighbor station belongs; or scheduling, based on the transmission strategy currently used by the target station, the first neighbor station corresponding to the transmission strategy to perform data transmission with the target station in the target mode; and sending, a request message to the target access point requesting to schedule the second neighbor station corresponding to the transmission strategy to perform data transmission with the target station in the target mode, in order to allow the first neighbor station and the second neighbor station to perform data transmission with the target station in the target mode, wherein the target access point is the access point in the BSS to which the second neighbor station belongs.

In conjunction with the first aspect or the first available implementation of the first aspect or the second available implementation of the first aspect, in a fifth available implementation of the first aspect, scheduling the scheduled station corresponding to the transmission strategy to perform data transmission with the target station in a target mode, includes:

scheduling the scheduled station corresponding to the transmission strategy to perform data transmission simultaneously with the target station; or scheduling to prohibit the scheduled station corresponding to the transmission strategy from transmitting data when the target station is transmitting data.

In conjunction with the first aspect or the first available implementation of the first aspect or the second available implementation of the first aspect, in a sixth available implementation of the first aspect, the identification information further includes information about signal strength, where the signal strength is strength of the signal from the target station to the neighbor station of the target station; and scheduling a scheduled station corresponding to the transmission strategy to perform data transmission with the target station in a target mode, includes:

scheduling a third neighbor station corresponding to the transmission strategy to perform data transmission simultaneously with the target station, wherein the third neighbor station is one or more of neighbor stations whose signal strength is lower than a preset lower limit of signal strength among all neighbor stations of the target station; or scheduling to prohibit a fourth neighbor station corresponding to the transmission strategy from transmitting data when the target station is transmitting data, wherein the fourth neighbor station is one or more of neighbor stations whose signal strength is greater than a preset upper limit of signal strength among all neighbor stations of the target station.

In a second aspect, a method for scheduling stations according to the embodiments of the disclosure includes:

sensing, by a target station, a signal sent by a station in a target region, and using the station from which the signal is able to be sensed and be demodulated correctly as a neighbor station;

sending, by the target station, identification information of the neighbor station to an access point, to allow the access point to treat each station except the neighbor station among the stations included in the basic service set as a latent hidden station of the target station, based on pre-acquired information of the basic service set to which the target station belongs and the identification information, and to allow the access point to schedule, based on a transmission strategy currently used by the target station, a scheduled station corresponding to the transmission strategy to perform data transmission with the target station in a target mode, where the scheduled station corresponding to the transmission strategy is the station corresponding to the transmission strategy in a mapping relation between the transmission strategy and station, and the target mode is a data transmission mode corresponding to the transmission strategy, where the scheduled station includes any one of the following:

the neighbor station and the latent hidden station.

In a third aspect, an AP according to the embodiments of the disclosure includes a receiving unit, a selecting unit, and a scheduling unit, where the receiving unit is configured to receive identification information of a neighbor station of a target station reported by the target station;

the selecting unit is configured to treat, based on information of a basic service set to which the target station belongs and the identification information, each station except the neighbor station among the stations included in the basic service set as a latent hidden station of the target station; and the scheduling unit, configured to schedule, based on a transmission strategy currently used by the target station, a scheduled station corresponding to the transmission strategy to perform data transmission with the target station in a target mode, wherein the scheduled station corresponding to the transmission strategy is the station corresponding to the transmission strategy in a mapping relation between the transmission strategy and station, and the target mode is a data transmission mode corresponding to the transmission strategy, where the scheduled station includes any one of the following:

the neighbor station and the latent hidden station.

In the first available implementation of the third aspect, the access point further includes:

a first establishing unit, configured to establish a correspondence relation between the target station and the neighbor station, and store the correspondence relation, to subsequently calculate the latent hidden station.

In conjunction with the third aspect or the first available implementation of the third aspect, in a second available implementation of the third aspect, the access point further includes: a second establishing unit, configured to establish a correspondence relation between the target station and the latent hidden station, and store the correspondence relation, to subsequently schedule the target station to perform data transmission with the latent hidden station in the target mode.

In conjunction with any one of the above implementation, in a third available implementation of the third aspect, the identification information further comprises information of the basic service set to which the neighbor station belongs; and the neighbor station includes a first neighbor station and a second neighbor station, where the first neighbor station is the neighbor station included in the basic service set to which the target station belongs, and the second neighbor station is the neighbor station not included in the basic service set to which the target station belongs.

In conjunction with the third available implementation of the third aspect, in a fourth available implementation of the third aspect, in a case that the scheduled station includes the second neighbor station, the scheduling unit is configured to send, based on the transmission strategy currently used by the target station, a request message to the target access point requesting to schedule the second neighbor station corresponding to the transmission strategy to perform data transmission with the target station in the target mode, in order to allow the target access point to schedule the second neighbor station to perform data transmission with the target station in the target mode, where the target access point is the access point in the basic service set to which the second neighbor station belongs; or the scheduling unit is configured to schedule the first neighbor station corresponding to the transmission strategy to perform data transmission with the target station in the target mode based on the transmission strategy currently used by the target station, and send, a request message to the target access point requesting to schedule the second neighbor station corresponding to the transmission strategy to perform data transmission with the target station in the target mode, in order to allow the first neighbor station and the second neighbor station to perform data transmission with the target station in the target mode, where the target access point is the access point in the basic service set to which the second neighbor station belongs.

In a fourth aspect, a station according to the embodiments of the disclosure includes a sensing unit and a sending unit, where the sensing unit is configured to sense a signal sent by a station in a target region, and treat the station from which the signal is able to be sensed and be demodulated correctly as a neighbor station; and the sending unit is configured to send identification information of the neighbor station to an access point, to allow the access point to treat each station except the neighbor station among the stations included in the basic service set as a latent hidden station of the target station, based on pre-acquired information of the basic service set to which the target station belongs and the identification information, and to allow the access point to schedule, based on a transmission strategy currently used by the target station, a scheduled station corresponding to the transmission strategy to perform data transmission with the target station in a target mode, wherein the scheduled station corresponding to the transmission strategy is the station corresponding to the transmission strategy in a mapping relation between the transmission strategy and station, and the target mode is a data transmission mode corresponding to the transmission strategy, where the scheduled station includes any one of the following:

the neighbor station and the latent hidden station.

In the above technical solution, the identification information of neighbor station of the target station reported by the target station is received, where the target station is able to sense a signal sent by the neighbor station and demodulate the signal correctly; based on pre-acquired information of the BSS to which the target station belongs and the identification information, each station except the neighbor station among the stations included in the BSS is treated as a latent hidden station of the target station; based on the transmission strategy currently used by the target station, the scheduled station corresponding to the transmission strategy is scheduled to perform data transmission with the target station in the target mode, where the scheduled station corresponding to the transmission strategy is the station corresponding to the transmission strategy in the pre-acquired mapping relation between the transmission strategy and station, and the target mode is the pre-acquired data transmission mode corresponding to the transmission strategy; and the scheduled station includes any one of the following: the neighbor station and the latent hidden station. Thus, advantage of the AP in the process of data transmission is effectively used, and additional overhead is reduced.

BRIEF DESCRIPTION OF THE DRAWINGS

In order to illustrate the technical solutions according to the embodiments of the disclosure or in the conventional technology more clearly, the drawings to be used in the description of the embodiments or the conventional technology are described briefly hereinafter. Apparently, the drawings in the following description are only a part of rather than all of the embodiments of the disclosure, and other drawings may be obtained by those skilled in the art according to those drawings without creative effort.

DETAILED DESCRIPTION OF THE EMBODIMENTS

Hereinafter, the technical solutions according to the embodiments of the disclosure are described clearly and completely in conjunction with the drawings. Apparently, the described embodiments are only a part of rather than all of the embodiments of the disclosure. All the other embodiments obtained by those skilled in the art based on the embodiments of the disclosure without creative effort fall within the protection scope of the disclosure.

Figure 1:
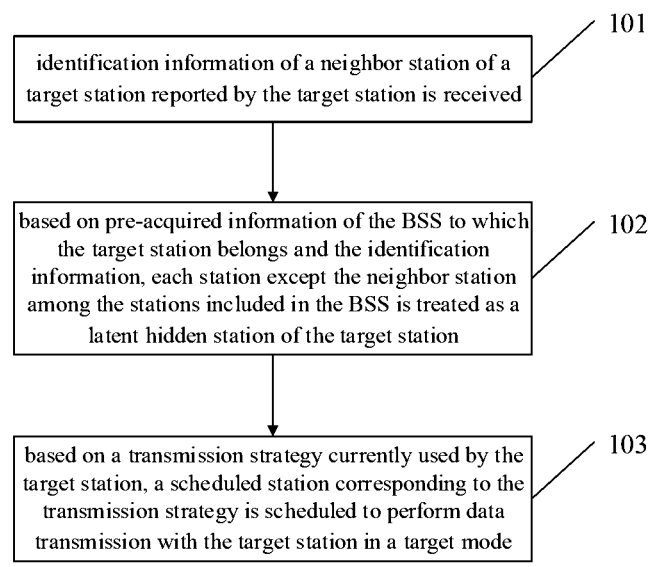
FIG. 1 is a flow chart of a method for scheduling stations according to an embodiment of the disclosure.

FIG. 1 is a flow chart of a method for scheduling stations according to an embodiment of the disclosure. As shown in FIG. 1, the method includes steps 101-103.

In step 101, identification information of a neighbor station of a target station reported by the target station is received;

In step 102, based on pre-acquired information of the BSS to which the target station belongs and the identification information, each station except the neighbor station among the stations included in the BSS is treated as a latent hidden station of the target station;

In step 103, based on a transmission strategy currently used by the target station, a scheduled station corresponding to the transmission strategy is scheduled to perform data transmission with the target station in a target mode, where the scheduled station corresponding to the transmission strategy is the station corresponding to the transmission strategy in a pre-acquired mapping relation between the transmission strategy and station; and the target mode is a pre-acquired data transmission mode corresponding to the transmission strategy; where the scheduled station includes any one of the following: the neighbor station and the latent hidden station.

Optionally, the above station may be a user device, such as cell phone, tablet computer and computing device.

Optionally, the embodiment of the disclosure may be applied to an AP. In other words, the AP may implement the above method.

Optionally, there may be one or more neighbor stations and one or more latent hidden stations, and the disclosure is not limited herein.

Optionally, scheduling a scheduled station corresponding to the transmission strategy to perform data transmission with the target station in a target mode, includes: scheduling the scheduled station corresponding to the transmission strategy to perform data transmission simultaneously with the target station, i.e., the transmission strategy is suitable for the case that stations latent hidden to each other initiate data transmission simultaneously, or the transmission strategy is suitable for the case that stations being neighbor to each other initiate data transmission simultaneously; or scheduling to prohibit the scheduled station corresponding to the transmission strategy from transmitting data when the target station is transmitting data, i.e., the transmission strategy prohibits stations latent hidden to each other from initiating data transmission simultaneously, or the transmission strategy prohibits stations being neighbor to each other from initiating data transmission simultaneously.

Optionally, the mapping relation between the transmission strategy and station may be the mapping relation between the transmission strategy and station combination, where the station combination is the combination of a plurality of stations allowed to initiate data transmission simultaneously, i.e., the transmission strategy is suitable for what station combination to initiate data transmission simultaneously. For example, MU MIMO transmission strategy is suitable for the case that stations latent hidden to each other initiate data transmission simultaneously, or the AP schedules the target station to transmit uplink data information, i.e., the strategy currently used by the target station for uplink data transmission. In a case that the target station currently uses MU MIMO transmission strategy or the strategy for uplink data transmission, the latent hidden station and target station are scheduled to initiate data transmission simultaneously in step 103. For example, if the target station currently uses the transmission strategy unsuitable for the case that stations latent hidden to each other initiate data transmission simultaneously, such as the case that the AP sends data information to the target station, i.e., the target station currently uses the strategy of downlink data transmission, the neighbor station and target station are scheduled to initiate data transmission simultaneously in step 103.

Optionally, the mapping relation between the transmission strategy and station may be the mapping relation between the transmission strategy and rival stations, where rival stations are the combination of a plurality of stations not allowed to initiate data transmission simultaneously, i.e., the transmission strategy is suitable to prohibit which stations from transmitting data when the target station is transmitting data, for example, the downlink data transmission strategy is suitable for prohibiting stations latent hidden to each other from initiating data transmission simultaneously.

In the above technical solution, the identification information of neighbor station of the target station reported by the target station is received, where the target station is able to sense a signal sent by the neighbor station and demodulate the signal correctly; based on pre-acquired information of the BSS to which the target station belongs and the identification information, each station except the neighbor station among the stations included in the BSS is treated as a latent hidden station of the target station; based on the transmission strategy currently used by the target station, the scheduled station corresponding to the transmission strategy is scheduled to perform data transmission with the target station in the target mode, where the scheduled station corresponding to the transmission strategy is the station corresponding to the transmission strategy in the pre-acquired mapping relation between the transmission strategy and station, and the target mode is the pre-acquired data transmission mode corresponding to the transmission strategy; and the scheduled station includes any one of the following: the neighbor station and the latent hidden station. Thus, advantage of the AP in the process of data transmission is effectively used, and additional overhead is reduced.

Figure 2:
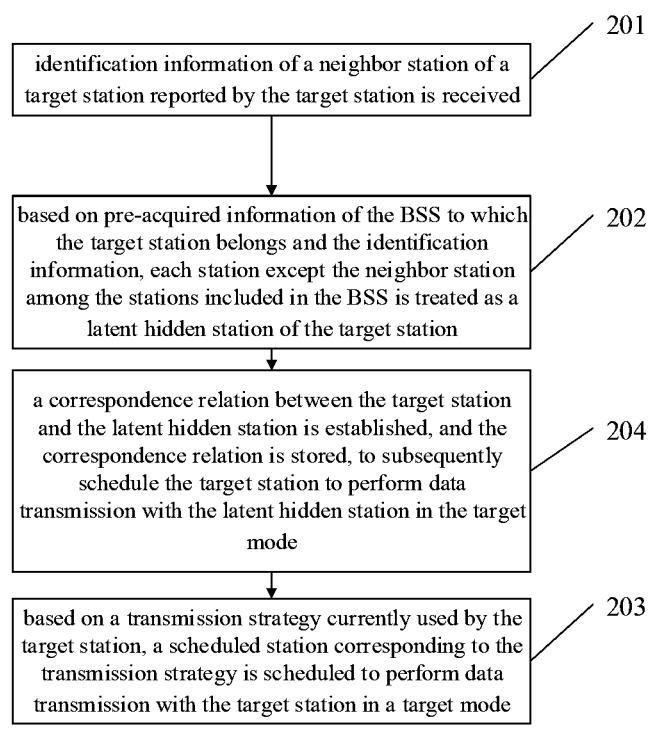
FIG. 2 is a flow chart of another method for scheduling stations according to an embodiment of the disclosure.

FIG. 2 is a flow chart of another method for scheduling stations according to an embodiment of the disclosure. As shown in FIG. 2, the method may include steps 201-204.

In step 201, identification information of a neighbor station of a target station reported by the target station is received.

Optionally, the target station is able to sense a signal sent by the neighbor station and demodulate the signal correctly.

Optionally, the identification information may be medium access control (MAC) address information and/or information of a basic service set (BSS) to which the target station belongs.

In step 202, based on pre-acquired information of the BSS to which the target station belongs and the identification information, each station except the neighbor station among the stations included in the BSS is treated as a latent hidden station of the target station.

Optionally, the information of the BSS may include: identification information of all stations included in the BSS.

Figure 3:
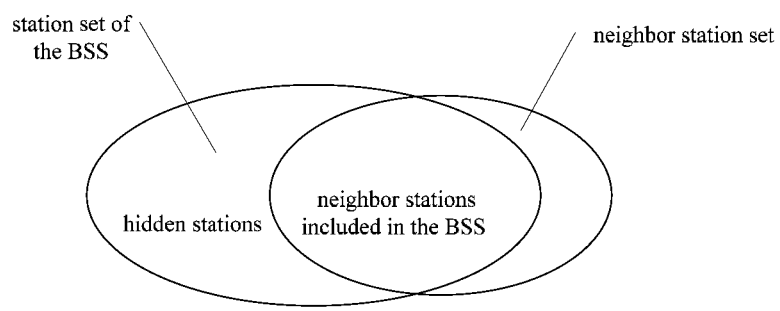
FIG. 3 is a diagram of an optional station according to an embodiment of the disclosure.

Optionally, as shown in FIG. 3, supposing that the neighbor station mentioned above includes neighbor stations included and not included in the BSS to which the target station belongs, and the BSS in FIG. 3 is the BSS to which the target station belongs, it may be known from FIG. 3 that the latent hidden station mentioned above includes all stations included in the BSS except the neighbor station(s) included in the BSS.

In step 203, based on a transmission strategy currently used by the target station, a scheduled station corresponding to the transmission strategy is scheduled to perform data transmission with the target station in a target mode, where the scheduled station corresponding to the transmission strategy is the station corresponding to the transmission strategy in a pre-acquired mapping relation between the transmission strategy and station; and the target mode is a pre-acquired data transmission mode corresponding to the transmission strategy; where the scheduled station includes any one of the following: the neighbor station and the latent hidden station.

As an optional implementation, the method may further include step 204 after step 202 and before step 203.

In step 204, a correspondence relation between the target station and the latent hidden station is established, and the correspondence relation is stored, to subsequently schedule the target station to perform data transmission with the latent hidden station in the target mode.

Optionally, the correspondence relation may be stored in the form of a table, as shown in Table 1.

TABLE 1

| STA | latent hidden station 1 | latent hidden station 2 | ... |
|---|---|---|---|
| STA1 | STA3 | STA4 | |
| STA2 | STA4 | STA5 | |
| STA3 | STA1 | STA6 | |
| STA4 | STA1 | STA2 | |
| STA5 | STA2 | ... | |
| STA6 | STA1 | ... | |
| ... | ... | ... | ... |

In the table, STA represents a station, thus the stations latent hidden to each station are shown simply.

Optionally, the stored station may use the MAC address as content of the stored station, or may use a temporary associated identifier (AID) allocated to respective stations by the AP as content of the stored station. In other words, in a subsequent read process, it is only needed to read the MAC address or the AID.

Optionally, the identification information further includes information of the BSS to which the neighbor station belongs; and the neighbor station includes a first neighbor station and a second neighbor station, where the first neighbor station is included in the BSS to which the target station belongs, and the second neighbor station is not included in the BSS to which the target station belongs. In other words, in step 202, each station except the first neighbor station among the stations included in the BSS to which the target station belongs is treated as the latent hidden station of the target station.

Optionally, the method may further include: establishing a correspondence relation between the target station and the second neighbor station, and storing the correspondence relation. The correspondence relation may also be stored in the form of table.

Optionally, the correspondence relation between the target station and latent hidden station, and the correspondence relation between the target station and the second neighbor station, may be stored in a table as shown in table 2:

TABLE 2

| STA | latent hidden station 1 | latent hidden station 2 | ... | the second neighbor station 1 |
|---|---|---|---|---|
| STA1 | STA3 | STA4 | | 0 |
| STA2 | STA4 | STA5 | | 0 |
| STA3 | STA1 | STA6 | | 0 |
| STA4 | STA1 | STA2 | | 0 |
| STA5 | STA2 | ... | | STA7 (BSS1) |
| STA6 | STA1 | ... | | STA8 (BSS1) |
| ... | ... | ... | ... | |

As shown in the above table, 0 represents nonexistence. For example, the latent hidden stations of STA1 are STA3 and STA4, and there is no second neighbor station for STA1. The latent hidden station of STA5 is STA2, and the second neighbor station of STA5 is STA7, where the BSS to which STA7 belongs is BSS1, and the BSS to which STA5 belongs is BSS0.

Figure 4:
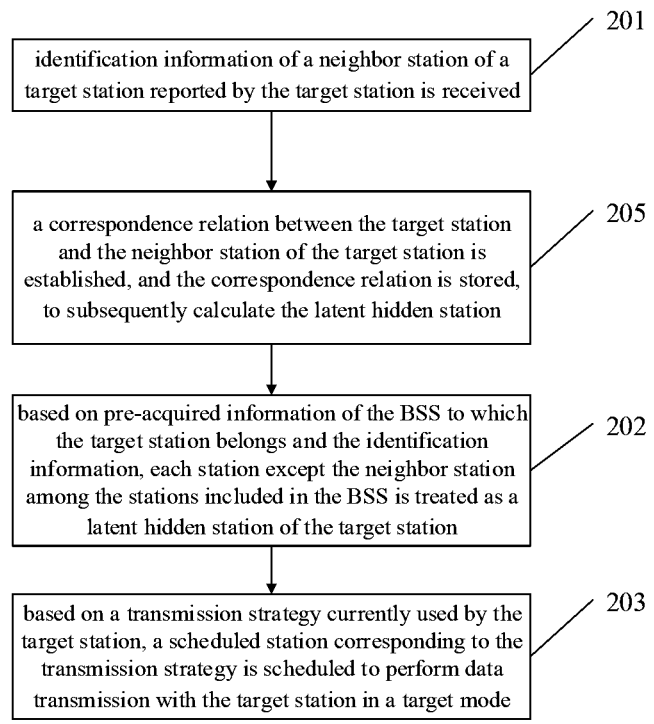
FIG. 4 is a flow chart of another method for scheduling stations according to an embodiment of the disclosure.

As an optional implementation, as shown in FIG. 4, the method may further include step 205 after step 201 and before step 202.

In step 205, a correspondence relation between the target station and the neighbor station of the target station is established, and the correspondence relation is stored, to subsequently calculate the latent hidden station.

Optionally, the implementation may be executed in conjunction with the above implementation including step 204, i.e., the method includes step 204 and step 205.

Optionally, the correspondence relation may also be stored in the form of the table, i.e., the above table may be referred to.

Optionally, the neighbor station may include a first neighbor station and a second neighbor station, where the first neighbor station is the neighbor station included in the BSS to which the target station belongs, and the second neighbor station is the neighbor station not included in the BSS to which the target station belongs. Thus in the above correspondence relation, or the table of the correspondence relation between the target station and the neighbor station of the target station, a distinction may be made between the first neighbor station and the second neighbor station, i.e., information of the BBSs to which respective neighbor stations belong are introduced to the above correspondence relation, hence when calculating the latent hidden station in step 202, the latent hidden station may be calculated based on the above correspondence relation between the target station and the neighbor station, and information of the BBSs to which respective neighbor stations belong. Of course, in the implementation, it is the correspondence relation between the target station and the neighbor station that is stored, thus step 202 may be executed when the target station needs to send data, or the AP needs to schedule the target station to send data.

As an optional method, in a case that the scheduled station includes the second neighbor station, step 203 may include: sending, a request message to the target AP requesting to schedule the second neighbor station corresponding to the transmission strategy to perform data transmission with the target station in the target mode, based on the transmission strategy currently used by the target station, in order to allow the target AP to schedule the second neighbor station to perform data transmission with the target station in the target mode, where the target AP is the AP for the BSS to which the second neighbor station belongs.

Optionally, the AP for the BSS to which the second neighbor station belongs may be the AP used to control or serve the BSS.

The AP associated with the BSS is well known, which is not described in detail herein.

For example, if the target station currently uses a network MIMO transmission strategy or an interference alignment (IA) transmission strategy, the target station may send the request message to the target AP requesting to schedule the second neighbor station corresponding to the transmission strategy to perform data transmission with the target station in the target mode, and once the target AP receives the request message, the target AP schedules the second neighbor station to perform data transmission with the target station in the target mode. As shown in above FIG. 1, the second neighbor station of STA5 is STA7, and the BSS to which STA7 belongs is BSS1, thus the above request message may be sent to the AP associated with BSS1, and the AP associated with BSS1 may schedule STA5 and STA7 to send data simultaneously.

Optionally, in a case that the scheduled station includes the second neighbor station and the first neighbor station, step 203 may include: scheduling the first neighbor station corresponding to the transmission strategy to perform data transmission with the target station in the target mode, based on the transmission strategy currently used by the target station; and sending, a request message to the target AP requesting to schedule the second neighbor station corresponding to the transmission strategy to perform data transmission with the target station in the target mode, in order to allow the first neighbor station and the second neighbor station to perform data transmission with the target station in the target mode, where the target AP is the AP for the BSS to which the second neighbor station belongs.

Thus the target station, the first neighbor station and the second neighbor station are scheduled to send data simultaneously.

As an optional method, the identification information further includes information about signal strength, where the signal strength is strength of the signal from the target station to the neighbor station of the target station; in other words, strength information of the signal from the target station to the neighbor station may be obtained through the identification information, thus in step 203, a scheduled station corresponding to the transmission strategy and having the most suitable signal strength in the transmission strategy may be scheduled to perform data transmission with the target station in the target mode, based on the transmission strategy currently used by the target station. For example: scheduling the scheduled station corresponding to the transmission strategy to perform data transmission with the target station in the target mode, may include: scheduling a third neighbor station corresponding to the transmission strategy to perform data transmission simultaneously with the target station, where the third neighbor station is one or more of the neighbor stations whose signal strength are lower than a preset lower limit of signal strength among all neighbor stations of the target station.

Thus the target station and the third neighbor station (i.e., the strength of the signal from the target station to the third neighbor station is very weak) may transmit data simultaneously, and there is very little interference when the target station and the third neighbor station transmit data simultaneously.

In other words, scheduling the scheduled station corresponding to the transmission strategy to perform data transmission with the target station in the target mode, may include: scheduling to prohibit a fourth neighbor station corresponding to the transmission strategy from transmitting data when the target station is transmitting data, where the fourth neighbor station is one or more of the neighbor stations whose signal strength is greater than a preset upper limit of signal strength among all neighbor stations of the target station.

Thus the case that the target station and the fourth neighbor station (i.e., the strength of the signal from the target station to the fourth neighbor station is very strong) transmit data simultaneously may be avoided, and large interference caused when the target station and the fourth neighbor station transmit data simultaneously may be avoided.

In the above technical solutions, a variety of implementation are proposed based on the embodiment, and advantage of the AP in the process of data transmission is effectively used, thus additional overhead is reduced.

Figure 5:
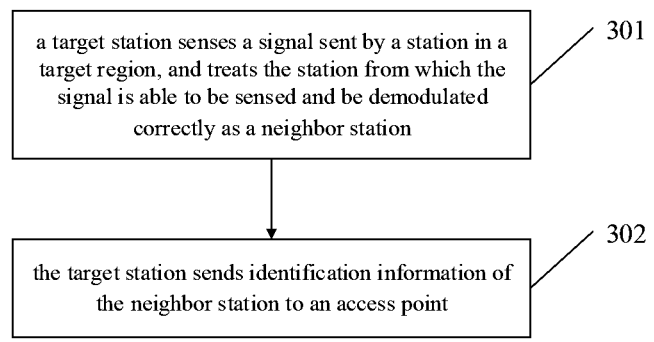
FIG. 5 is a flow chart of another method for scheduling stations according to an embodiment of the disclosure.

FIG. 5 is a flow chart of another method for scheduling stations according to an embodiment of the disclosure. As shown in FIG. 5, the method includes steps 301-302.

In step 301, a target station senses a signal sent by a station in a target region, and treats the station from which the signal is able to be sensed and be demodulated correctly as a neighbor station.

In step 302, the target station sends identification information of the neighbor station to an AP, to allow the AP to treat each station except the neighbor station among the stations included in the BSS as a latent hidden station of the target station, based on pre-acquired information of the BSS to which the target station belongs and the identification information, and allow the AP to schedule a scheduled station corresponding to the transmission strategy to perform data transmission with the target station in a target mode based on a transmission strategy currently used by the target station, where the scheduled station corresponding to the transmission strategy is the station corresponding to the transmission strategy in a pre-acquired mapping relation between the transmission strategy and station, and the target mode is a pre-acquired data transmission mode corresponding to the transmission strategy; where the scheduled station includes any one of the following: the neighbor station and the latent hidden station.

Optionally, the above station may be a user device, such as cell phone, tablet computer and computing device. In other words, the embodiments of the disclosure may be applied to cell phone, tablet computer and computing device, i.e., the cell phone, tablet computer and computing device may implement the above method.

Optionally, the target region may be a region which can be sensed by the target station, or a pre-designated region.

Optionally, there may be one or more neighbor stations and one or more latent hidden stations, and the disclosure is not limited herein.

Optionally, the target station sends identification information of the neighbor station to the AP may include: sending, by the target station, identification information of the neighbor station to the AP periodically; or sending, by the target station, identification information of the neighbor station to the AP when the information of the neighbor station of the target station changes; or sending, by the target station, identification information of the neighbor station to the AP when receiving from the AP a request message requesting the sending identification information of the neighbor station.

Optionally, the mapping relation between the transmission strategy and station may be the mapping relation between the transmission strategy and station combination, where the station combination is the combination of a plurality of stations allowed to initiate data transmission simultaneously, i.e., the transmission strategy is suitable for what station combination to initiate data transmission simultaneously. For example, MU MIMO transmission strategy is suitable for the case that stations latent hidden to each other initiate data transmission simultaneously, or the AP schedules the target station to transmit uplink data information, i.e., the strategy currently used by the target station for uplink data transmission. In a case that the target station currently uses MU MIMO transmission strategy or the strategy for uplink data transmission, the AP schedules the latent hidden station and target station to initiate data transmission simultaneously. For example, if the target station currently uses the transmission strategy unsuitable for the case that stations latent hidden to each other initiate data transmission simultaneously, such as the case that the AP sends data information to the target station, i.e., the target station currently uses the strategy of downlink data transmission, the AP schedules the neighbor station and target station to initiate data transmission simultaneously.

In the above technical solution, the target station senses the signal sent by the station in the target region, and treats the station from which the signal is able to be sensed and be demodulated correctly as the neighbor station; the target station sends identification information of the neighbor station to the AP, to allow the AP to use each station except the neighbor station among the stations included in the BSS as the latent hidden station of the target station, based on pre-acquired information of the BSS to which the target station belongs and the identification information; and the AP schedules the scheduled station corresponding to the transmission strategy to perform data transmission with the target station in the target mode based on the transmission strategy currently used by the target station, where the scheduled station corresponding to the transmission strategy is the station corresponding to the transmission strategy in the pre-acquired mapping relation between the transmission strategy and station, and the scheduled station includes any one of the following: the neighbor station and the latent hidden station. Thus, advantage of the AP in the process of data transmission is effectively used, and additional overhead is reduced.

The following are apparatus embodiments of the disclosure, to execute the first method embodiment to the third method embodiment of the disclosure. To describe clearly, only parts associated with the embodiments of the disclosure are illustrated, and for technical details not revealed, the first embodiment, the second embodiment and the third embodiments of the disclosure may be referred to.

Figure 6:
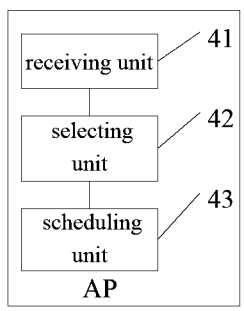
FIG. 6 is a structural diagram of an AP according to an embodiment of the disclosure.

FIG. 6 is a structural diagram of an AP according to an embodiment of the disclosure. As shown in FIG. 6, the AP includes: a receiving unit 41, a selecting unit 42 and a scheduling unit 43.

The receiving unit 41 is configured to receive identification information of a neighbor station of a target station reported by the target station; optionally, the above identification information may be MAC address information and/or information of the BSS to which the target station belongs.

The selecting unit 42 is configured to treat each station except the neighbor station among the stations included in the BSS as a latent hidden station of the target station, based on pre-acquired information of the BSS to which the target station belongs and the identification information; the scheduling unit 43 is configured to schedule a scheduled station corresponding to the transmission strategy to perform data transmission with the target station in a target mode based on a transmission strategy currently used by the target station, where the scheduled station corresponding to the transmission strategy is the station corresponding to the transmission strategy in a pre-acquired mapping relation between the transmission strategy and station, and the target mode is a pre-acquired data transmission mode corresponding to the transmission strategy; where the scheduled station includes any one of the following: the neighbor station and the latent hidden station.

Optionally, the above station may be a user device, such as cell phone, tablet computer and computing device.

Optionally, there may be one or more neighbor stations and one or more latent hidden stations, and the disclosure is not limited herein.

Optionally, scheduling the scheduled station corresponding to the transmission strategy to perform data transmission with the target station in the target mode, includes: scheduling the scheduled station corresponding to the transmission strategy to perform data transmission simultaneously with the target station; or scheduling to prohibit the scheduled station corresponding to the transmission strategy from transmitting data when the target station is transmitting data.

In the above technical solution, the identification information of neighbor station of the target station reported by the target station is received, where the target station is able to sense a signal sent by the neighbor station, and demodulate the signal correctly; based on pre-acquired information of the BSS to which the target station belongs and the identification information, each station except the neighbor station among the stations included in the BSS is treated as the latent hidden station of the target station; based on the transmission strategy currently used by the target station, the scheduled station corresponding to the transmission strategy is scheduled to perform data transmission with the target station in the target mode, where the scheduled station corresponding to the transmission strategy is the station corresponding to the transmission strategy in the pre-acquired mapping relation between the transmission strategy and station, and the scheduled station includes any one of the following: the neighbor station and the latent hidden station. Thus, advantage of the AP in the process of data transmission is effectively used, and additional overhead is reduced.

Figure 7:
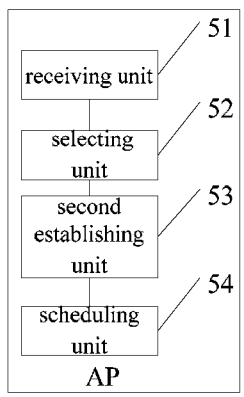
FIG. 7 is a structural diagram of another AP according to an embodiment of the disclosure.

FIG. 7 is a structural diagram of an AP according to an embodiment of the disclosure. As shown in FIG. 7, the AP includes: a receiving unit 51, a selecting unit 52, a second establishing unit 53 and a scheduling unit 54.

The receiving unit 51 is configured to receive identification information of a neighbor station of a target station reported by the target station; optionally, the target station is able to sense a signal sent by the neighbor station and demodulate the signal correctly.

Optionally, the above identification information may be MAC address information and/or information of the BSS to which the target station belongs.

The selecting unit 52 is configured to treat each station except the neighbor station among the stations included in the BSS as a latent hidden station of the target station, based on pre-acquired information of the BSS to which the target station belongs and the identification information;

Optionally, the information of the BSS may include identification information of stations included in the BSS.

The second establishing unit 53 is configured to establish a correspondence relation between the target station and the latent hidden station and store the correspondence relation, to subsequently schedule the target station to perform data transmission with the latent hidden station.

The scheduling unit 54 is configured to schedule a scheduled station corresponding to the transmission strategy to perform data transmission with the target station in a target mode based on a transmission strategy currently used by the target station, where the scheduled station corresponding to the transmission strategy is the station corresponding to the transmission strategy in a pre-acquired mapping relation between the transmission strategy and station, and the target mode is a pre-acquired data transmission mode corresponding to the transmission strategy; where the scheduled station includes any one of the following: the neighbor station and the latent hidden station.

Optionally, the above storage station may use the MAC address as content of the stored station, or may use a temporary AID allocated to respective stations by the AP as content of the stored station. In other words, in a subsequent read process, it is only needed to read the MAC address or the AID.

Optionally, the identification information further includes information of the BSS to which the neighbor station belongs; and the neighbor station includes a first neighbor station and a second neighbor station, where the first neighbor station is the neighbor station included in the BSS to which the target station belongs, and the second neighbor station is the neighbor station not included in the BSS to which the target station belongs. In other words, the selecting unit 52 may treat each station except the first neighbor station among the stations included in the BSS to which the target station belongs as the latent hidden station of the target station.

Optionally, the AP may further include: a third establishing unit (not shown in the drawings), configured to establish a correspondence relation between the target station and the second neighbor station and store the correspondence relation. The correspondence relation may also be stored in the form of a table.

Optionally, the correspondence relation between the target station and the latent hidden station, together with the correspondence relation between the target station and the above second neighbor station may be stored in a table, as shown in Table 2.

As an optional implementation, in a case that the scheduled station includes the second neighbor station, the scheduling unit 54 may be further configured to send, a request message to the target AP requesting to schedule the second neighbor station corresponding to the transmission strategy to perform data transmission with the target station in the target mode, based on the transmission strategy currently used by the target station, in order to allow the target AP to schedule the second neighbor station to perform data transmission with the target station in the target mode, where the target AP is the AP for the BSS to which the second neighbor station belongs; in a case that the scheduled station includes the first neighbor station and the second neighbor station, the scheduling unit 54 may be further configured to schedule the first neighbor station corresponding to the transmission strategy to perform data transmission with the target station in the target mode based on the transmission strategy currently used by the target station; and send, a request message to the target AP requesting to schedule the second neighbor station corresponding to the transmission strategy to perform data transmission with the target station in the target mode, in order to allow the first neighbor station and the second neighbor station to perform data transmission with the target station in the target mode, where the target AP is the AP for the BSS to which the second neighbor station belongs.

As an optional implementation, the identification information further includes information about signal strength, where the signal strength is strength of the signal from the target station to the neighbor station of the target station; in other words, strength information of the signal from the target station to each neighbor station may be obtained through the identification information, thus the scheduling unit 54 may be further configured to schedule a scheduled station corresponding to the transmission strategy and having the most suitable signal strength in the transmission strategy to perform data transmission with the target station in the target mode, based on the transmission strategy currently used by the target station. For example: the scheduling unit 54 may be further configured to schedule a third neighbor station corresponding to the transmission strategy to perform data transmission simultaneously with the target station, where the third neighbor station is one or more of neighbor stations whose signal strength is lower than a preset lower limit of signal strength among all neighbor stations of the target station.

Thus the case that the target station and the third neighbor station (i.e., the strength of the signal from the target station to the third neighbor station is very weak) may transmit data simultaneously, and there is very little interference when the target station and the third neighbor station transmit data simultaneously.

Or, the scheduling unit 54 may be further configured to prohibit a fourth neighbor station corresponding to the transmission strategy from performing data transmission simultaneously with the target station, where the fourth neighbor station is one or more of neighbor stations whose signal strength is greater than a preset upper limit of signal strength among all neighbor stations of the target station.

Thus the case that the target station and the fourth neighbor station (i.e., the strength of the signal from the target station to the fourth neighbor station is very strong) send data simultaneously may be avoided, and large interference caused when the target station and the fourth neighbor station send data simultaneously may be avoided.

In the above technical solutions, a variety of implementation are proposed based on the embodiments, and advantage of the AP in the process of data transmission is effectively used, thus additional overhead is reduced.

Figure 8:
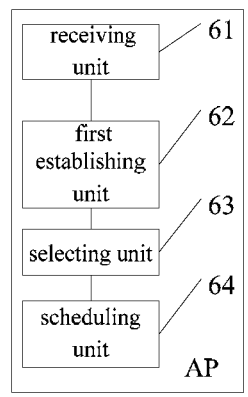
FIG. 8 is a structural diagram of another AP according to an embodiment of the disclosure.

FIG. 8 is a structural diagram of an AP according to an embodiment of the disclosure. As shown in FIG. 8, the AP includes: a receiving unit 61, a first establishing unit 62, a selecting unit 63, and a scheduling unit 64.

The receiving unit 61 is configured to receive identification information of a neighbor station of a target station reported by the target station, where the target station is able to sense a signal sent by the neighbor station and demodulate the signal correctly.

The first establishing unit 62 is configured to establish a correspondence relation between the target station and the neighbor station and store the correspondence relation, to subsequently calculate a latent hidden station.

The selecting unit 63 is configured to treat each station except the neighbor station among the stations included in the BSS as the latent hidden station of the target station, based on pre-acquired information of the BSS to which the target station belongs and the identification information.

The scheduling unit 64 is configured to schedule a scheduled station corresponding to the transmission strategy to perform data transmission with the target station in a target mode based on a transmission strategy currently used by the target station, where the scheduled station corresponding to the transmission strategy is the station corresponding to the transmission strategy in a pre-acquired mapping relation between the transmission strategy and station, and the target mode is a pre-acquired data transmission mode corresponding to the transmission strategy; where the scheduled station includes any one of the following: the neighbor station and the latent hidden station.

Optionally, the identification information further includes information of the BSS to which the neighbor station belongs; and the neighbor station may include a first neighbor station and a second neighbor station, where the first neighbor station is the neighbor station included in the BSS to which the target station belongs, and the second neighbor station is the neighbor station not included in the BSS to which the target station belongs. Thus in the above correspondence relation, or the table of correspondence relation between the target station and the neighbor station of the target station, a distinction may be made between the first neighbor station and the second neighbor station, i.e., information of the BBSs to which respective neighbor stations belong are introduced to the above correspondence relation, hence when the selecting unit 63 calculates the latent hidden station, the latent hidden station may be calculated based on the above correspondence relation between the target station and the neighbor station, and the information of the BBSs to which respective neighbor stations belong.

As an optional method, the AP may further include: a second establishing unit (not shown in the drawings), configured to establish a correspondence relation between the target station and the latent hidden station and store the correspondence relation, in order to subsequently schedule the target station to perform data transmission with the latent hidden station.

As an optional implementation, in a case that the scheduled station includes the second neighbor station, the scheduling unit 64 may be further configured to send, a request message to the target AP requesting to schedule the second neighbor station corresponding to the transmission strategy to perform data transmission with the target station in the target mode, based on the transmission strategy currently used by the target station, in order to allow the target AP to schedule the second neighbor station to perform data transmission with the target station in the target mode, where the target AP is the AP for the BSS to which the second neighbor station belongs; in a case that the scheduled station includes the first neighbor station and the second neighbor station, the scheduling unit 64 may be further configured to schedule the first neighbor station corresponding to the transmission strategy to perform data transmission with the target station in the target mode based on the transmission strategy currently used by the target station; and send, a request message to the target AP requesting to schedule the second neighbor station corresponding to the transmission strategy to perform data transmission with the target station in the target mode, in order to allow the first neighbor station and the second neighbor station to perform data transmission with the target station in the target mode, where the target AP is the AP for the BSS to which the second neighbor station belongs.

In the above technical solutions, a variety of implementation are proposed based on the embodiments, and advantage of the AP in the process of data transmission is effectively used, thus additional overhead is reduced.

Figure 9:
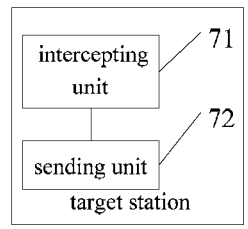
FIG. 9 is a structural diagram of a target station according to an embodiment of the disclosure.

FIG. 9 is a structural diagram of a target station according to an embodiment of the disclosure. As shown in FIG. 9, the target station includes a sensing unit 71 and a sending unit 72.

The sensing unit 71 is configured to sense a signal sent by a station in a target region, and use the station from which the signal is able to be sensed and be demodulated correctly as a neighbor station.

The sending unit 72 is configured to send identification information of the neighbor station to an AP, to allow the AP to treat each station except the neighbor station among the stations in the BSS as a latent hidden station of the target station, based on pre-acquired information of the BSS to which the target station belongs and the identification information; the AP schedules a scheduled station corresponding to the transmission strategy to perform data transmission with the target station in a target mode based on a transmission strategy currently used by the target station, where the scheduled station corresponding to the transmission strategy is the station corresponding to the transmission strategy in a pre-acquired mapping relation between the transmission strategy and station, and the target mode is a pre-acquired data transmission mode corresponding to the transmission strategy; where the scheduled station includes any one of the following: the neighbor station and the latent hidden station.

Optionally, the above station may be a user device, such as cell phone, tablet computer and computing device. In other words, the embodiment of the disclosure may be applied to cell phone, tablet computer and computing device.

Optionally, there may be one or more neighbor stations and one or more latent hidden stations, and the disclosure is not limited herein.

In the above technical solution, the target station senses the signal sent by the station in the target region, and treats the station from which the signal is able to be sensed and be demodulated correctly as the neighbor station; the target station sends identification information of the neighbor station to the AP, to allow the AP to treat each station except the neighbor station among the stations included in the BSS as the latent hidden station of the target station, based on pre-acquired information of the BSS to which the target station belongs and the identification information; the AP schedules the scheduled station corresponding to the transmission strategy to perform data transmission with the target station in the target mode based on the transmission strategy currently used by the target station, where the scheduled station corresponding to the transmission strategy is the station corresponding to the transmission strategy in the pre-acquired mapping relation between the transmission strategy and station, and the scheduled station includes any one of the following: the neighbor station and the latent hidden station. Thus, advantage of the AP in the process of data transmission is effectively used, and additional overhead is reduced.

Figure 10:
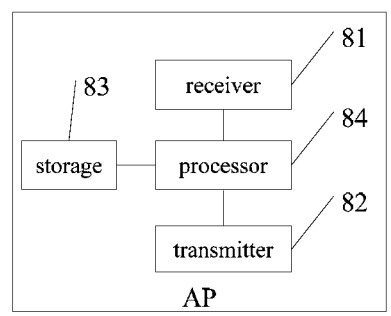
FIG. 10 is a structural diagram of another AP according to an embodiment of the disclosure.

FIG. 10 is a structural diagram of another AP according to an embodiment of the disclosure. As shown in FIG. 9, the AP includes a receiver 81, a transmitter 82, a storage 83, and a processor 84 connected to the receiver 81, the transmitter 82, and the storage 83, where the storage 83 is configured to store a set of program codes, and the processor 84 is configured to call the program stored in the storage 83 to execute the following operations: controlling the receiver 81 to receive identification information of a neighbor station of a target station reported by the target station; treating each station except the neighbor station among the stations included in the BSS as a latent hidden station of the target station, based on pre-acquired information of the BSS to which the target station belongs and the identification information; and controlling the transmitter 82 to schedule a scheduled station corresponding to the transmission strategy to perform data transmission with the target station in a target mode based on a transmission strategy currently used by the target station, where the scheduled station corresponding to the transmission strategy is the station corresponding to the transmission strategy in a pre-acquired mapping relation between the transmission strategy and station, and the target mode is a pre-acquired data transmission mode corresponding to the transmission strategy; where the scheduled station includes any one of the following: the neighbor station and the latent hidden station.

Optionally, the above station may be a user device, such as cell phone, tablet computer and computing device.

Optionally, the operation of the processor 84 for controlling the transmitter 82 to schedule a scheduled station corresponding to the transmission strategy to perform data transmission with the target station in a target mode may include: controlling the transmitter 82 to schedule the scheduled station corresponding to the transmission strategy to perform data transmission along with the target station simultaneously; or controlling the transmitter 82 to schedule to prohibit the scheduled station corresponding to the transmission strategy from transmitting data when the target station is transmitting data.

According to another optional embodiment, the processor 84 is further configured to execute the following operations: controlling the receiver 81 to receive identification information of a neighbor station of a target station reported by the target station; treating each station except the neighbor station among the stations included in the BSS as a latent hidden station of the target station, based on pre-acquired information of the BSS to which the target station belongs and the identification information; and controlling the transmitter 82 to schedule a scheduled station corresponding to the transmission strategy to perform data transmission with the target station in a target mode based on a transmission strategy currently used by the target station, where the scheduled station corresponding to the transmission strategy is the station corresponding to the transmission strategy in a pre-acquired mapping relation between the transmission strategy and station, and the target mode is a pre-acquired data transmission mode corresponding to the transmission strategy; where the scheduled station includes any one of the following: the neighbor station and the latent hidden station.

As an optional implementation, the processor 84 is configured to, after executing the operation of treating each station except the neighbor station among the stations included in the BSS as a latent hidden station of the target station based on pre-acquired information of the BSS to which the target station belongs and the identification information, and before executing the operation of controlling the transmitter 82 to schedule a scheduled station corresponding to the transmission strategy to perform data transmission with the target station in a target mode, execute the following operations: establishing a correspondence relation between the target station and the latent hidden station, and storing the correspondence relation, to subsequently schedule the target station to perform data transmission with the latent hidden station in the target mode.

Optionally, the identification information further includes information of the BSS to which the neighbor station belongs; and the neighbor station includes a first neighbor station and a second neighbor station, where the first neighbor station is the neighbor station included in the BSS to which the target station belongs, and the second neighbor station is the neighbor station not included in the BSS to which the target station belongs. In other words, the processor 84 treats each station except the first neighbor station among the stations included in the BSS to which the target station belongs as the latent hidden station of the target station.

Optionally, the processor 84 may further execute the following operations: establishing a correspondence relation between the target station and the second neighbor station, and storing the correspondence relation. The correspondence relation may also be stored in the form of the table.

As an optional implementation, the processor 84 may further, after executing the operation of controlling the receiver 81 to receive identification information of a neighbor station of a target station reported by the target station, and before executing the operation of treating each station except the neighbor station among the stations included in the BSS as a latent hidden station of the target station based on pre-acquired information of the BSS to which the target station belongs and the identification information, execute the following operations: establishing a correspondence relation between the target station and the neighbor station of the target station, and storing the correspondence relation, to subsequently calculate the latent hidden station.

Optionally, the correspondence relation may also be stored in the form of the table, i.e., the above table may be referred to.

Optionally, the neighbor station may include a first neighbor station and a second neighbor station, where the first neighbor station is the neighbor station included in the BSS to which the target station belongs, and the second neighbor station is the neighbor station not included in the BSS to which the target station belongs.

As an optional method, in a case that the scheduled station includes the second neighbor station, the operation, executed by the processor 84, of controlling the transmitter 82 to schedule a scheduled station corresponding to the transmission strategy to perform data transmission with the target station in the target mode, based on the transmission strategy currently used by the target station, may further include: controlling the transmitter 82 to send, a request message to the target AP requesting to schedule the second neighbor station corresponding to the transmission strategy to perform data transmission with the target station in the target mode, based on the transmission strategy currently used by the target station, in order to allow the target AP to schedule the second neighbor station to perform data transmission with the target station in the target mode, where the target AP is the AP for the BSS to which the second neighbor station belongs.

Optionally, in a case that the scheduled station includes the second neighbor station and the first neighbor station, the operation, executed by the processor 84, of controlling the transmitter 82 to schedule a scheduled station corresponding to the transmission strategy to perform data transmission with the target station in the target mode, based on the transmission strategy currently used by the target station, may further include: scheduling the first neighbor station corresponding to the transmission strategy to perform data transmission with the target station in the target mode, based on the transmission strategy currently used by the target station; and sending, a request message to the target AP requesting to schedule the second neighbor station corresponding to the transmission strategy to perform data transmission with the target station in the target mode, in order to allow the first neighbor station and the second neighbor station to perform data transmission with the target station in the target mode, where the target AP is the AP for the BSS to which the second neighbor station belongs.

Thus the target station, the first neighbor station and the second neighbor station are scheduled to send data simultaneously.

As an optional method, the identification information further includes information about signal strength, where the signal strength is strength of the signal from the target station to the neighbor station of the target station; in other words, strength information of the signal from the target station to the neighbor station may be obtained through the identification information, thus the processor 84 may further schedule a scheduled station corresponding to the transmission strategy and having the most suitable signal strength in the transmission strategy to perform data transmission with the target station in the target mode, based on the transmission strategy currently used by the target station. For example: the operation, executed by the processor 84, of scheduling the scheduled station corresponding to the transmission strategy to perform data transmission with the target station in the target mode, may include: scheduling a third neighbor station corresponding to the transmission strategy to perform data transmission simultaneously with the target station, where the third neighbor station is one or more of neighbor stations whose signal strength is lower than a preset lower limit of signal strength among all neighbor stations of the target station.

Thus the target station and the third neighbor station (i.e., the strength of the signal from the target station to the third neighbor station is very weak) may send data simultaneously, and there is very little interference when the target station and the third neighbor station send data simultaneously.

The operation, executed by the processor 84, of scheduling the scheduled station corresponding to the transmission strategy to perform data transmission with the target station in the target mode, may include: prohibiting a fourth neighbor station corresponding to the transmission strategy from performing data transmission simultaneously with the target station, where the fourth neighbor station is one or more of neighbor stations whose signal strength is greater than a preset upper limit of signal strength among all neighbor stations of the target station.

Thus the case that the target station and the fourth neighbor station (i.e., the strength of the signal from the target station to the fourth neighbor station is very strong) send data simultaneously may be avoided, and large interference caused when the target station and the fourth neighbor station send data simultaneously may be avoided.

In the above technical solution, the identification information of neighbor station of the target station reported by the target station is received, where the target station is able to sense a signal sent by the neighbor station, and demodulate the signal correctly; based on pre-acquired information of the BSS to which the target station belongs and the identification information, each station except the neighbor station among the stations included in the BSS are treated as a latent hidden station of the target station; based on the transmission strategy currently used by the target station, the scheduled station corresponding to the transmission strategy is scheduled to perform data transmission with the target station in the target mode, where the scheduled station corresponding to the transmission strategy is the station corresponding to the transmission strategy in the pre-acquired mapping relation between the transmission strategy and station, and the target mode is the pre-acquired data transmission mode corresponding to the transmission strategy; and the scheduled station includes any one of the following: the neighbor station and the latent hidden station. Thus, advantage of the AP in the process of data transmission is effectively used, and additional overhead is reduced.

Figure 11:
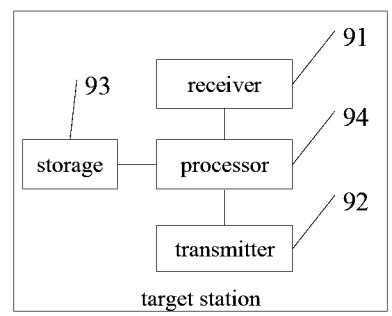
FIG. 11 is a structural diagram of another target station according to an embodiment of the disclosure.

FIG. 11 is a structural diagram of another target station according to an embodiment of the disclosure. As shown in FIG. 11, the target station includes a receiver 91, a transmitter 92, a storage 93, and a processor 94 connected to the receiver 91, transmitter 92, and storage 93, where the storage 93 is configured to store a set of program codes, the processor 94 is configured to call the program stored in the storage 93 to execute the following operations: controlling the receiver 91 to sense a signal sent by a station in a target region, and use the station from which the signal is able to be sensed and be demodulated correctly as a neighbor station; and controlling the transmitter 92 to send identification information of the neighbor station to an AP, to allow the AP to treat each station except the neighbor station among the stations included in the BSS as a latent hidden station of the target station, based on pre-acquired information of the BSS to which the target station belongs and the identification information; and allow the AP to schedule a scheduled station corresponding to the transmission strategy to perform data transmission with the target station in a target mode based on a transmission strategy currently used by the target station, where the scheduled station corresponding to the transmission strategy is the station corresponding to the transmission strategy in a pre-acquired mapping relation between the transmission strategy and station, and the target mode is a pre-acquired data transmission mode corresponding to the transmission strategy; where the scheduled station includes any one of the following: the neighbor station and the latent hidden station.

Optionally, the station may be a user device, such as cell phone, tablet computer and computing device.

Optionally, the case that the target station sends identification information of the neighbor station to the AP may include: sending, by the target station, identification information of the neighbor station to the AP periodically; or sending, by the target station, identification information of the neighbor station to the AP when the information of the neighbor station of the target station changes; or sending, by the target station, identification information of the neighbor station to the AP when receiving from the AP a request message to request sending identification information of the neighbor station.

In the above technical solution, the target station senses the signal sent by the station in the target region, and treats the station from which the signal is able to be sensed and be demodulated correctly as the neighbor station; the target station sends identification information of the neighbor station to the AP, to allow the AP to treat each station except the neighbor station among the stations included in the BSS as the latent hidden station of the target station, based on pre-acquired information of the BSS to which the target station belongs and the identification information; and the AP schedules the scheduled station corresponding to the transmission strategy to perform data transmission with the target station in the target mode based on the transmission strategy currently used by the target station, where the scheduled station corresponding to the transmission strategy is the station corresponding to the transmission strategy in the pre-acquired mapping relation between the transmission strategy and station, and the scheduled station includes any one of the following: the neighbor station and the latent hidden station. Thus, advantage of the AP in the process of data transmission is effectively used, and additional overhead is reduced.

Figure 12:
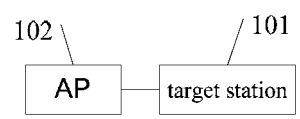
FIG. 12 is a structural diagram of a system for scheduling stations according to an embodiment of the disclosure.

FIG. 12 is a structural diagram of a system for scheduling stations according to an embodiment of the disclosure. As shown in FIG. 12, the system includes a target station 101 and an AP 102.

The target station 101 may be the target station in any of the embodiments shown in FIG. 9 and FIG. 11.

The AP 102 may be the AP in any of the embodiments shown in FIG. 6, FIG. 7, FIG. 8 and FIG. 10.

In the above technical solution, the AP receives the identification information of neighbor station of the target station reported by the target station, where the target station is able to sense a signal sent by the neighbor station, and demodulate the signal correctly; based on pre-acquired information of the BSS to which the target station belongs and the identification information, the AP treats each station except the neighbor station among the stations included in the BSS as the latent hidden station of the target station; and based on the transmission strategy currently used by the target station, the AP schedules the scheduled station corresponding to the transmission strategy to perform data transmission with the target station in the target mode, where the scheduled station corresponding to the transmission strategy is the station corresponding to the transmission strategy in the pre-acquired mapping relation between the transmission strategy and station, the target mode is a pre-acquired data transmission mode corresponding to the transmission strategy, and the scheduled station includes any one of the following: the neighbor station and the latent hidden station. Thus, advantages of the AP in the process of data transmission are effectively used, and additional overhead is reduced.

Those skilled in the art may understand that all or a part of the processes in the method according to the above embodiments may be implemented through hardware related to a computer program instruction, and the program may be stored in a computer readable storage medium, where the program may include the processes in the method according to the above embodiments. The storage medium may be a disk, compact disc, read-only memory (ROM) or random access memory (RAM).

The above are only preferred embodiments of the invention, and should not be used to limit the scope of the claims of the invention, thus an equivalent modification made based on the claims of the invention falls within the scope of the invention.

What is claimed is:

1. A method for scheduling stations, comprising:
   receiving, by an access point, identification information of a neighbor station of a target station reported by the target station;
   designating, by the access point, based on pre-acquired information of a basic service set to which the target station belongs and the identification information, each station except the neighbor station among the stations included in the basic service set as a latent hidden station of the target station; and
   scheduling, by the access point, based on a transmission strategy currently used by the target station, a scheduled station corresponding to the transmission strategy to perform data transmission with the target station in a target mode, wherein the scheduled station corresponding to the transmission strategy is the station corresponding to the transmission strategy in a pre-acquired mapping relation between transmission strategies and stations, which comprises the neighbor station or the latent hidden station, and the target mode is a data transmission mode corresponding to the transmission strategy,
   wherein the identification information comprises information of the basic service set to which the neighbor station belongs,
   wherein the neighbor station comprises a first neighbor station and a second neighbor station, the first neighbor station is the neighbor station included in the basic service set to which the target station belongs, and the second neighbor station is the neighbor station not included in the basic service set to which the target station belongs, and
   wherein the scheduled station comprises the second neighbor station, the scheduling the scheduled station is selected from the group consisting of:
   sending, based on the transmission strategy currently used by the target station, a request message to a target access point requesting to schedule the second neighbor station corresponding to the transmission strategy to perform data transmission with the target station in the target mode, in order to allow the target access point to schedule the second neighbor station to perform data transmission with the target station in the target mode, wherein the target access point is the access point in the basic service set to which the second neighbor station belongs; and
   scheduling, based on the transmission strategy currently used by the target station, the first neighbor station corresponding to the transmission strategy to perform data transmission with the target station in the target mode; and sending, a request message to the target access point requesting to schedule the second neighbor station corresponding to the transmission strategy to perform data transmission with the target station in the target mode, in order to allow the first neighbor station and the second neighbor station to perform data transmission with the target station in the target mode, wherein the target access point is the access point in the basic service set to which the second neighbor station belongs.

2. The method according to claim 1, further comprising:
   establishing a correspondence relation between the target station and the neighbor station, to allow the target station to designate each station except the neighbor station among the stations included in the basic service set as the latent hidden station of the target station based on the correspondence relation.

3. The method according to claim 1, further comprising:
   establishing a correspondence relation between the target station and the latent hidden station, to schedule the target station to perform data transmission with the latent hidden station in the target mode.

4. The method according to claim 1, wherein the scheduling the scheduled station is selected from the group consisting of:
   scheduling the scheduled station corresponding to the transmission strategy to perform data transmission simultaneously with the target station; and
   scheduling to prohibit the scheduled station corresponding to the transmission strategy from transmitting data when the target station is transmitting data.

5. The method according to claim 1, wherein:
   the identification information comprises information about signal strength, wherein the signal strength is strength of the signal from the target station to the neighbor station of the target station; and
   the scheduling the scheduled station is selected from the group consisting of:
   scheduling a third neighbor station corresponding to the transmission strategy to perform data transmission simultaneously with the target station, wherein the third neighbor station is one or more of neighbor stations whose signal strength is lower than a preset lower limit of signal strength among all neighbor stations of the target station; and
   scheduling to prohibit a fourth neighbor station corresponding to the transmission strategy from transmitting data when the target station is transmitting data, wherein the fourth neighbor station is one or more of neighbor stations whose signal strength is greater than a preset upper limit of signal strength among all neighbor stations of the target station.

6. A method for scheduling stations, comprising:
   sensing, by a target station, a signal sent by a station in a target region, and treating the station from which the signal is able to be sensed and be demodulated correctly as a neighbor station; and
   sending, by the target station, identification information of the neighbor station to an access point, to allow the access point to identify each station except the neighbor station among the stations included in the basic service set as a latent hidden station of the target station based on pre-acquired information of the basic service set to which the target station belongs and the identification information, and to allow the access point to schedule, based on a transmission strategy currently used by the target station, a scheduled station corresponding to the transmission strategy to perform data transmission with the target station in a target mode, wherein the scheduled station corresponding to the transmission strategy is the station corresponding to the transmission strategy in a mapping relation between the transmission strategy and station, which comprises the neighbor station and the latent hidden station, and the target mode is a data transmission mode corresponding to the transmission strategy, wherein the identification information comprises information of the basic service set to which the neighbor station belongs, wherein the neighbor station comprises a first neighbor station and a second neighbor station, the first neighbor station is the neighbor station included in the basic service set to which the target station belongs, and the second neighbor station is the neighbor station not included in the basic service set to which the target station belongs, and wherein the scheduled station comprises the second neighbor station, the access point scheduling the scheduled station is selected from the group consisting of:

sending, based on the transmission strategy currently used by the target station, a request message to a target access point requesting to schedule the second neighbor station corresponding to the transmission strategy to perform data transmission with the target station in the target mode, in order to allow the target access point to schedule the second neighbor station to perform data transmission with the target station in the target mode, wherein the target access point is the access point in the basic service set to which the second neighbor station belongs; and scheduling, based on the transmission strategy currently used by the target station, the first neighbor station corresponding to the transmission strategy to perform data transmission with the target station in the target mode; and sending, a request message to the target access point requesting to schedule the second neighbor station corresponding to the transmission strategy to perform data transmission with the target station in the target mode, in order to allow the first neighbor station and the second neighbor station to perform data transmission with the target station in the target mode, wherein the target access point is the access point in the basic service set to which the second neighbor station belongs.

7. An access point comprising:
a receiver, configured to receive identification information of a neighbor station of a target station reported by the target station; and
a processor, configured to:
designate, based on information of a basic service set to which the target station belongs and the identification information, each station except the neighbor station among the stations included in the basic service set as a latent hidden station of the target station; and
schedule, based on a transmission strategy currently used by the target station, a scheduled station corresponding to the transmission strategy to perform data transmission with the target station in a target mode, wherein the scheduled station corresponding to the transmission strategy is the station corresponding to the transmission strategy in a mapping relation between the transmission strategy and station, comprising the neighbor station and the latent hidden station, and the target mode is a data transmission mode corresponding to the transmission strategy, wherein the identification information further comprises information of the basic service set to which the neighbor station belongs, wherein the neighbor station comprises a first neighbor station and a second neighbor station, the first neighbor station is the neighbor station included in the basic service set to which the target station belongs, and the second neighbor station is the neighbor station not included in the basic service set to which the target station belongs, and wherein the scheduled station comprises the second neighbor station, the processor is further configured to perform one of the group consisting of:

send, based on the transmission strategy currently used by the target station, a request message to a target access point requesting to schedule the second neighbor station corresponding to the transmission strategy to perform data transmission with the target station in the target mode, in order to allow the target access point to schedule the second neighbor station to perform data transmission with the target station in the target mode, wherein the target access point is the access point in the basic service set to which the second neighbor station belongs; and schedule, based on the transmission strategy currently used by the target station, the first neighbor station corresponding to the transmission strategy to perform data transmission with the target station in the target mode; and send, a request message to the target access point requesting to schedule the second neighbor station corresponding to the transmission strategy to perform data transmission with the target station in the target mode, in order to allow the first neighbor station and the second neighbor station to perform data transmission with the target station in the target mode, wherein the target access point is the access point in the basic service set to which the second neighbor station belongs.

8. The access point according to claim 7, wherein the processor is further configured to:
establish a correspondence relation between the target station and the neighbor station, to allow the target station to identify each station except the neighbor station among the stations included in the basic service set as the latent hidden station of the target station based on the correspondence relation.

9. The access point according to claim 7, wherein the processor is further configured to:
establish a correspondence relation between the target station and the latent hidden station, to schedule the target station to perform data transmission with the latent hidden station in the target mode.

10. A target station comprising:
a network interface, configured to receive a signal sent by a station in a target region, and treat the station from which the signal is able to be sensed and be demodulated correctly as a neighbor station; and
a second network interface, configured to send identification information of the neighbor station to an access point, to allow the access point to identify each station except the neighbor station among the stations included in the basic service set as a latent hidden station of the target station based on pre-acquired information of the basic service set to which the target station belongs and the identification information, and to allow the access point to schedule, based on a transmission strategy currently used by the target station, a scheduled station corresponding to the transmission strategy to perform data transmission with the target station in a target mode, wherein the scheduled station corresponding to the transmission strategy is the station corresponding to the transmission strategy in a mapping relation between the transmission strategy and station, comprising the neighbor station and the latent hidden station, and the target mode is a data transmission mode corresponding to the transmission strategy, wherein the identification information comprises information of the basic service set to which the neighbor station belongs, wherein the neighbor station comprises a first neighbor station and a second neighbor station, the first neighbor station is the neighbor station included in the basic service set to which the target station belongs, and the second neighbor station is the neighbor station not included in the basic service set to which the target station belongs, and wherein the scheduled station comprises the second neighbor station, the access point scheduling the scheduled station is selected from the group consisting of:

sending, based on the transmission strategy currently used by the target station, a request message to a target access point requesting to schedule the second neighbor station corresponding to the transmission strategy to perform data transmission with the target station in the target mode, in order to allow the target access point to schedule the second neighbor station to perform data transmission with the target station in the target mode, wherein the target access point is the access point in the basic service set to which the second neighbor station belongs; and scheduling, based on the transmission strategy currently used by the target station, the first neighbor station corresponding to the transmission strategy to perform data transmission with the target station in the target mode; and sending, a request message to the target access point requesting to schedule the second neighbor station corresponding to the transmission strategy to perform data transmission with the target station in the target mode, in order to allow the first neighbor station and the second neighbor station to perform data transmission with the target station in the target mode, wherein the target access point is the access point in the basic service set to which the second neighbor station belongs.

11. The method according to claim 1, wherein the transmission strategy comprises at least one of Multiuser Multiple-Input Multiple-Output transmission strategy, uplink data transmission strategy, downlink data transmission strategy or interference alignment transmission strategy.

12. The method according to claim 6, wherein the transmission strategy comprises at least one of Multiuser Multiple-Input Multiple-Output transmission strategy, uplink data transmission strategy, downlink data transmission strategy or interference alignment transmission strategy.

13. The access point according to claim 7, wherein the transmission strategy comprises at least one of Multiuser Multiple-Input Multiple-Output transmission strategy, uplink data transmission strategy, downlink data transmission strategy or interference alignment transmission strategy.

14. The target station according to claim 10, wherein the transmission strategy comprises at least one of Multiuser Multiple-Input Multiple-Output transmission strategy, uplink data transmission strategy, downlink data transmission strategy or interference alignment transmission strategy.

* * * * *